United States Patent Office 3,152,936
Patented Oct. 13, 1964

3,152,936
AMMONIUM NITRATE PROPELLANT COMPOSITION CONTAINING DINITROSALICYLATE COMBUSTION CATALYST
Edwin K. Ives, Whiting, Ind., assignor to Standard Oil Company, Chicago, Ill., a corporation of Indiana
No Drawing. Filed Aug. 27, 1962, Ser. No. 219,741
6 Claims. (Cl. 149—19)

This invention relates to an ammonium nitrate-type propellant composition containing a catalyst for promoting the combustion of such composition.

In ammonium nitrate compositions which consist essentially of ammonium nitrate particles and an oxidizable organic binder material, which permits the shaping of the composition into a definite configuration or grain, it is necessary to promote the combustion of the composition by the use of a catalyst. Commonly used catalysts are the inorganic chromium compounds, particularly ammonium dichromate and the Prussian blues. These and other heavy metal catalysts have the drawback of forming solid oxide products in the combustion gases which cause nozzle erosion which erosion results in erratic change in gas pressure within the rocket motor. Sodium barbiturate is an excellent catalyst. However, the sodium reacts in the combustion gases to form solid sodium carbonate in substantial yield. This solid forms objectionable ash deposits for some uses. Also, the barbiturate catalysts tend to give lower burning rate propellants even at substantial content of catalyst.

It has been found that a suitable ammonium nitrate-type composition for gas generator and rocketry usage is obtained with ammonium nitrate as the major component, between about 10 and 40 weight percent of oxidizable organic binder material and, as the combustion catalyst, between about 0.1 and 15 weight percent of an alkali metal salt of a nitrosalicylic acid.

The novel combustion catalyst of the invention is an alkali metal salt of a nitrosalicylic acid. Any of the alkali metals may be used; owing to its cheapness and ease of manufacture, the sodium salt is most commonly used. Any of the various nitro group substituted salicylic acids may be used. One or more nitro groups may be present. Alkyl substituted acids may be used. Also, the disalicylic acids which are joined through an alkylene bridge may be used, for example, dinitromethylene disalicylic acid.

Sufficient catalyst must be introduced into the composition to promote the burning of the composition. The amount of catalyst used is also influenced by the rate of burning desired. The more catalyst present, the faster the combustion of the composition. (It is to be understood that the burning rate is also affected by the particular oxidizable organic binder material present.) In general, the composition will contain between about 0.1 and 15 weight percent of the catalyst. (Hereinafter all percentages are to be understood as weight percent.) With the thermoplastic matrix formers or binders obtained from cellulose esters and plasticizers therefor, between about 1 and 7% of catalyst produces satisfactory burning rates for typical military gas generation and rocketry usages.

The ammonium nitrate may be the high purity material commonly produced by synthetic plants today, or it may be technical grade containing small amounts of inorganic impurities. In addition to the ammonium nitrate, for special purposes, sodium nitrate or potassium nitrate may be present in an appreciable amount. The decomposition rate of the ammonium nitrate is influenced by the particle size. For gas generation purposes, the ammonium nitrate is finely divided. Particularly suitable ammonium nitrate will contain about 80 weight percent of material having a screen size greater than 80 mesh and smaller than 30 mesh. The more finely powdered ammonium nitrate is used where higher burning rates are desired. Usually the propellant composition will contain between about 60 and about 80% of ammonium nitrate. In all cases, the major component present in the composition is ammonium nitrate.

In order to permit the shaping of the ammonium nitrate composition into definite configurations, a matrix former or binder material is present. When ammonium nitrate decomposes, free-oxygen is released. The existence of this free-oxygen permits oxidizable organic materials to be used as the binders and thereby obtain additional gas production. These oxidizable organic materials may contain only carbon and hydrogen, for example, high molecular weight hydrocarbons such as asphalts or residuums, and rubbers, either natural or synthetic. Or, it may contain other elements in addition to carbon and hydrogen, for example, as in Thiokol rubber and neoprene. The stoichiometry of the composition is improved, with respect to smoke production, by the use of organic materials containing combined oxygen as the binders. The binder or matrix former may be a single compound such as a rubber or asphalt or it may be a mixture of compounds. The mixtures are particularly suitable when special characteristics are to be imparted to the propellant which cannot be obtained by the use of a single compound.

Multi-component binder, or matrix former, consists of a polymeric base material and a plasticizer therefor. Particularly suitable polymeric base materials are cellulose esters of alkanoic acids containing from 2 to 4 carbon atoms such as cellulose acetate, cellulose acetate butyrate and cellulose propionate. The polyvinyl resins such as polyvinylchloride and polyvinyl acetate are good bases. Styreneacrylonitrile is an example of a copolymer which forms a good base material. Polyacrylonitrile is another suitable base material.

The plasticizer component of the binder also, preferably, contains combined oxygen. The oxygen may be present in the plasticizer as an ether linkage and/or hydroxyl and/or carboxyl; also the oxygen may be present as a part of an inorganic substituent, particularly, a nitro group. In general, any plasticizer which is adapted to plasticize the particular polymer may be used in the invention. A single plasticizing compound may be used; more usually two or more compounds are used in conjunction. Exemplary classes of plasticizers which are suitable are set out below. (It is to be understood that these classes are illustrative only and do not limit the types of organic compounds which may be used to plasticize the polymer.)

Di-lower alkyl-phthalates, e.g., dimethyl phthalate, dibutyl phthalate, dioctyl phthalate and dimethyl nitrophthlate.
Nitrobenzenes, e.g., nitrobenzene, dinitrobenzene, nitrotoluene, dinitrotoluene, nitroxylene, and nitrodiphenyl.
Nitrodiphenyl ethers, e.g., nitrodiphenyl ether and 2,4-dinitrodiphenyl ether.
Tri-lower alkyl-citrates, e.g., triethyl citrate, tributyl citrate and triamyl citrate.
Acyl tri-lower alkyl-citrates where the acyl group contains 2–4 carbon atoms, e.g., acetyl triethyl citrate and acetyl tributyl citrate.
Glycerol-lower alkanoates, e.g., monoacetin, triacetin, glycerol tripropionate and glycerol tributyrate.
Lower alkylene-glycol-lower alkanoates wherein the glycol portion has a molecular weight below about 200, e.g., ethylene glycol diacetate, triethylene glycol dihexoate, triethylene glycol dioctoate, polyethylene glycol dioctoate, dipropylene glycol diacetate, nitromethyl propanediol diacetate, hydroxyethyl acetate and hydroxy propyl acetate (propylene glycol monoacetate).

Dinitrophenyl-lower alkyl-lower alkanoates, e.g., dinitrophenyl ethylacetate, and dinitrophenyl amyloctoate.

Lower alkylene-glycols wherein the molecular weight is below about 200, e.g., diethylene glycol, polyethylene glycol (200), and tetrapropylene glycol.

Lower alkylene-glycol oxolates, e.g., diethylene glycol oxolate and polyethylene glycol (200) oxolate.

Lower alkylene-glycol maleates, e.g., ethylene glycol maleate and bis-(diethylene glycol monoethyl ether) maleate.

Lower alkylene-glycol diglycolates, e.g., ethylene glycol diglycolate and diethylene glycol diglycolate.

Miscellaneous diglycollates, e.g., dibutyl diglycollate, dimethylalkyl diglycollate and methyl Carbitol diglycollate.

Lower alkyl-phthalyl-lower alkyl-glycollate, e.g., methyl phthalyl ethyl glycollate, ethyl phthalyl ethyl glycollate and butyl phthalyl butyl glycollate.

Di-lower alkyloxy-tetraglycol, e.g., dimethoxy tetra glycol and dibutoxy tetra glycol.

Nitrophenylether of lower alkylene glycols, e.g., dinitrophenyl ether of triethylene glycol and nitrophenyl ether of polypropylene glycol.

Nitrophenoxy alkanols wherein the alkanol portion is derived from a glycol having a molecular weight of not more than about 200. These may be pure compounds or admixed with major component bis(nitrophenoxy) alkane.

In addition to the main components, i.e., ammonium nitrate binder and catalyst, the propellant composition may contain other components. For example, materials may be present to improve low temperature ignitability, for instance, oximes or asphalt; surfactants may be present in order to improve the adhesion of the nitrate and the binder—also to improve the shape retention characteristics of the composition; burning rate promoters which are not considered to be true catalysts such as finely divided carbon may also be present; other combustion catalysts may also be present.

Aromatic hydrocarbon amines may be present in order to improve storage stability, particularly at higher atmospheric temperatures. Illustrations of these aromatic amines are toluene diamine, diphenyl amine, naphthalene diamine, and toluene triamine. In general, these are present in amount between about 0.5 and 5 percent. Better stabilization is obtained when N-phenylmorpholine is also present. Because of the plasticizing power of the N-phenylmorpholine it is customary to use the aromatic hydrocarbon amines as the primary stabilizing additive and the N-phenylmorpholine in addition in the amount necessary to reach the stability needed in the specific composition. In general, when aromatic hydrocarbon amines are also present, between about 0.1% and 1% of N-phenylmorpholine will be present.

A particularly good composition consists of cellulose acetate, about 6–12%; acetyltriethylcitrate, about 6–12%; dinitrophenoxyethanol, about 6–12%; carbon, about 2–6%; toluene diamine, about 0.5%; N-phenylmorpholine, about 0.5%; catalyst, about 1–7% and the remainder ammonium nitrate.

ILLUSTRATIONS

The effectiveness of the nitrosalicylate catalyst was tested in two well established ammonium nitrate propellant compositions. For purposes of comparison, monosodium barbiturate catalyzed compositions are also presented.

Each composition was prepared by mixing together for one hour in a laboratory mixer a 1 quart batch having ingredients in the proportions set forth hereinbelow. The mixing temperature was about 100° C. Celanese HLFS–93 grade cellulose acetate, analyzing about 55 percent of acetic acid equivalent, was the polymer. Two plasticizers were used. One plasticizer contained about three parts of dinitrophenoxyethanol and one part of bis(dinitrophenoxy)ethane, obtained by the reaction of dinitrochlorobenzene and ethylene glycol in the presence of aqueous sodium hydroxide solution. The other plasticizer was acetyl triethyl citrate. Toluene diamine and N-phenylmorpholine were used as stabilizers.

After mixing the resulting pasty mass was compression molded into a slab approximately one-half inch in thickness. The slab was subsequently sawed into strips for the burning rate test. The burning rate tests were conducted in a Crawford Bomb pressured at 1000 p.s.i.a. and at 25° C.

A composition having a high burning rate used for propulsion purposes, identified as Mark 5188, is set out.

| | Percent |
|---|---|
| Ammonium nitrate | 61.0 |
| Cellulose acetate | 9.0 |
| Acetyl triethyl citrate | 9.0 |
| Dinitrophenoxyethanol | 10.0 |
| Carbon black | 5.0 |
| Toluene diamine | 0.5 |
| N-phenylmorpholine | 0.5 |
| Sodium 3,5-dinitrosalicylate | 5.0 |

Another composition was prepared containing 3.0% of sodium 3,5-dinitrosalicylate in one case and 3.0% of monosodium barbiturate in another case. The component analysis of this composition is:

| | Percent |
|---|---|
| Ammonium nitrate | 62.4 |
| Cellulose acetate | 9.2 |
| Acetyl triethyl citrate | 9.2 |
| Dinitrophenoxyethanol | 10.2 |
| Carbon black | 5.0 |
| Toluene diamine | 0.5 |
| N-phenylmorpholine | 0.5 |
| Catalyst | 3.0 |

The sodium dinitrosalicylate contains only 60% of the sodium metal contained by an equal weight of monosodium barbiturate. Thus, Mark 5188 contains the same weight of sodium metal as does the 3.0% sodium barbiturate containing composition, Mark 4212A. The 3.0% sodium dinitrosalicylate composition is identified as Mark 5180A.

In addition to obtaining the burning rate of inches per second at 1,000 p.s.i.a., the pressure exponent "$n$" was obtained for each composition. The burning characteristics of nondetonating explosives are dependent upon the temperature and pressure in the combustion chamber. The relationship of burning rate and pressure at constant temperatures is expressed by R. N. Wimpress in "Internal Ballistics of Solid Fuel Rockets" (1950), as $$B = \beta \left(\frac{p}{1000}\right)^n$$

wherein B is the linear burning rate at pressure, $p$, $\beta$ is the linear burning rate for the composition at 1000 p.s.i., $p$ is the pressure in p.s.i. in the burning chamber and $n$ is the pressure exponent showing dependence of burning rate on pressure and is the numerical value equal to the slope of the curve of burning rate in inches per second obtained by plotting the burning rate versus pressure on log-log paper. A composition having a pressure exponent of the order of 1.0 readily passes into detonation with only a small amount of shock. The lower the value of "$n$" the less is the detonating character of the decomposition of the gas-producing component and the more even and smooth is the burning rate of the propellant grain. Thus a sustained thrust rather than a detonation is obtained by smooth burning of the grain.

The results of the burning rate tests on the three compositions above are set out in Table A below.

Table A

| Mark | Catalyst | Cat. Wt. (percent) | Burning Rate | n |
|---|---|---|---|---|
| 4212A | Sodium Barbiturate | 3 | 0.110 | 0.65 |
| 5180A | Sodium Dinitrosalicylate | 3 | 0.130 | 0.58 |
| 5188 | ____do____ | 5 | 0.155 | 0.57 |

Comparing the two compositions which contain the same weight percent of sodium metal, i.e., Mark 5188 and Mark 4212A, it is seen that the sodium 3,5-dinitrosalicylate catalyst produced a burning rate increase of about 40% over the burning rate of the sodium barbiturate catalyzed composition. Mark 5180 establishes that even with a sodium metal content, only 60% that of Mark 4212A, a burning rate increase of about 18% is obtained. (It is to be understood that the above comparisons, based on sodium metal content, are not intended to imply that sodium metal is the catalyst. Because the sodium produces ash, this comparison is made in order to show that the dinitrosalicylate catalyst will produce a much lower ash residue—owing to the lower metal content—at the same burning rate composition.)

It is of interest that the sodium dinitrosalicylate containing compositions have, within experimental error, the same lower pressure exponent of about 0.57. The numerical or percentage differential between the 0.65 pressure exponent of the barbiturate containing composition does not express the real beneficial effect on pressure maintenance on a rocket motor obtained with the lower pressure exponent dinitrosalicylate containing compositions.

Another series of comparative compositions was prepared using a conventional monosodium barbiturate containing composition as the standard composition. This standard composition, which is identified as Mark SGC–101, is set out by component analysis below.

| | Percent |
|---|---|
| Ammonium nitrate | 61.00 |
| Cellulose acetate | 10.15 |
| Acetyl triethyl citrate | 11.60 |
| Dinitrophenoxyethanol | 10.25 |
| Carbon black | 3.00 |
| Toluene diamine | 0.50 |
| N-phenylmorpholine | 0.50 |
| Monosodium barbiturate | 3.00 |

The comparison compositions contained as the catalyst lithium 3,5-dinitrosalicylate. Mark 5311 contained 5% of the dinitrosalicylate catalyst and Mark 5320 contained 6% of the dinitrosalicylate catalyst.

The standard composition, Mark SGC–101, had a burning rate of 0.086 inch per second, at 1,000 p.s.i.a. and a pressure exponent of 0.52.

Mark 5311, containing 5% of the lithium 3,5-dinitrosalicylate, had a burning rate of 0.100 and a pressure exponent of 0.50.

Mark 5320, containing 6% of lithium 3,5-dinitrosalicylate, had a burning rate of 0.085 inch per second at 1,000 p.s.i.a. and a pressure exponent of 0.50. Repeated testing of this particular composition in different batches established that the difference in burning rate between the Mark 5320 composition and the lower catalyst content Mark 5311 composition were real. In determining the pressure exponent over a range of pressures in the Crawford Bomb, it was discovered that Mark 5320 had a unique behavior when the test was carried out at pressures on the order of 1,200 p.s.i.a. and above. It was discovered that the pressure exponent abruptly decreased to 0.0 when the pressure was above about 1,200 p.s.i.a. This means that for chamber pressure of 1,200 p.s.i.a. and above, this composition has a burning rate which is independent of chamber pressure, a very desirable characteristic. Tests carried out on other compositions containing more than 5% of the lithium 3,5-dinitrosalicylate confirm that this unusual behavior at 1,200 p.s.i.a. and above is characteristic of this particular catalyst at catalyst contents of at least about 6%.

It has been found that the alkali metal salts of nitrosalicylic acid are readily prepared by carrying out the reaction in a solvent for the acid. When 1 gram atom equivalent of alkali metal is added to the salt solution, analysis shows that the product is essentially only the monoalkali metal salt with the alkali metal having reacted with the carboxyl group. When 2 gram atom equivalents of alkali metal are used, both active hydrogens are reacted so that alkali metal ion is present at the carboxy position as well as at the hydroxy position in the acid nucleus. Methane is a particularly good reaction medium with alkali metal methoxide as the alkali metal affording reactant.

Both the monosalt and the disalt possess catalytic effectiveness toward the decomposition of ammonium nitrate. It has been observed that the disalt is less stable than the monosalt and, therefore, where stability is of primary importance, the monosalt is preferred.

Thus having described the invention, what is claimed is:

1. A propellant composition consisting essentially of about 0.1–15 weight percent, as a combustion catalyst, of an alkali metal salt of a nitrosalicylic acid; ammonium nitrate as the major component; and between about 10 and 40 weight percent of oxidizable organic binder material selected from at least one member of the class consisting of hydrocarbon, rubber containing essentially hydrogen, carbon and chlorine, rubber containing essentially hydrogen, carbon and sulfur, plasticized cellulose esters of alkanoic acids containing from 2 to 4 carbon atoms, plasticized polyvinylchloride, plasticized polyvinylacetate, plasticized styrene acrylonitrile copolymer and plasticized polyacrylonitrile.

2. The composition of claim 1 wherein said catalyst is sodium 3,5-dinitrosalicylate.

3. The composition of claim 1 wherein said catalyst is lithium 3,5-dinitrosalicylate.

4. The composition of claim 3 wherein the catalyst content is at least about 6%.

5. A propellant composition consisting essentially of about 0.1–15 weight percent, as a combustion catalyst, of an alkali metal salt of a nitrosalicylic acid; ammonium nitrate as the major component; and between about 10 and 40 weight percent of a cellulose ester of alkanoic acid having from 2 to 4 carbon atoms and a plasticizer adapted to plasticize said ester.

6. A propellant composition consisting essentially of cellulose acetate, about 6–12%; acetyl triethyl citrate, about 6–12%; about 6–12% of dinitrophenoxyethanol; carbon, about 2–6%; toluene diamine, about 0.5%; N-phenylmorpholine, about 0.5%; sodium 3,5-dinitrosalicylate, about 1–7%; and the remainder ammonium nitrate.

References Cited in the file of this patent

UNITED STATES PATENTS 3,020,180    Morello    Feb. 6, 1962